331-98

High freq. osc. with Coaxial type long line variable tuned tank circuit.

Nov. 28, 1950 P. S. LANSMAN 2,531,693

LINE-TUNED OSCILLATOR

Filed Aug. 22, 1946 2 Sheets-Sheet 1

INVENTOR.
Paul S. Lansman

BY M. C. Hayes

ATTORNEY

SEARCH ROOM

Nov. 28, 1950 P. S. LANSMAN 2,531,693

LINE-TUNED OSCILLATOR

Filed Aug. 22, 1946 2 Sheets-Sheet 2

INVENTOR.
Paul S. Lansman

BY M. O. Hayes

ATTORNEY

Patented Nov. 28, 1950

2,531,693

UNITED STATES PATENT OFFICE 2,531,693

LINE-TUNED OSCILLATOR

Paul S. Lansman, Beverly Hills, Calif., assignor to the United States of America as represented by the Secretary of the Navy Application August 22, 1946, Serial No. 692,361

13 Claims. (Cl. 250—36)

This invention relates to tunable oscillators the frequencies of which are controlled by one or more pairs of parallel lines. A primary object is to provide an oscillator apparatus eliminating all discrete feedback structure in a tunable negative grid oscillator while retaining substantially a constant grid-drive ratio over a relatively wide tuning range. A further object is the provision of a tracked oscillator; that is one in which only a single tuning control need be manipulated for nearly optimum performance over a range of frequencies. A more general object is to provide an improved tunable oscillator, one which is stable, efficient and compact, and which requires a minimum of adjustments in changing from one frequency to another.

In designing tunable triode oscillators for frequencies of the order of 200 mcs., it is indicated that lumped circuit constants may advantageously be replaced by shorted parallel lines, the design being such as to allow for and utilize the interelectrode capacities of the triode. The structural character and proportions of such an oscillator, in which the feedback ratio is desirably constant and independent of the tuning adjustment, might be haphazardly come upon; but according to the present invention, it has been found that the concentric line analogue of the tuned-plate tuned-grid oscillator may be expected to be most stable as to feed back. Further, it has been found that the feedback ratio will be constant at a chosen value regardless of tuning adjustment, provided that the lines are equal in electrical length, with the characteristic impedances of the grid-cathode and plate-cathode lines having a certain relationship. Finally, by arranging the lines as doubly concentric with the cathode cylinder intermediate of the plate and grid cylinders, a compact oscillator results in which the tuning rings may be moved substantially as a unit in changing the frequency.

The invention will be better understood from the following detailed disclosure of a specific illustrative embodiment, in which.

Figure 4:
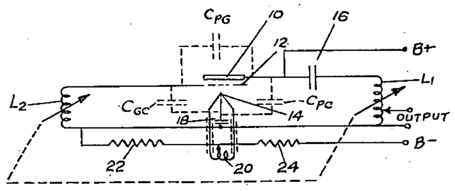
Fig. 4 is a lumped-constant representation of the complete oscillator.

Referring first to Fig. 4, there is shown a form of tuned-plate tuned-grid oscillator in which $L_1$ is the lumped representation of the plate inductance; $L_2$ similarly is the grid inductance; $C_{pg}$, $C_{gc}$, and $C_{pc}$ are the interelectrode capacities of a triode having plate 10, grid 12 and cathode 14. Inductance $L_1$ has an R.-F. connection through blocking capacitor 16 to plate 10. At its opposite terminal inductance $L_1$ is connected (for R.-F.) to cathode 14 through blocking capacitor 18. Inductance $L_2$ is connected between grid 12 and the cathode terminal of inductance $L_1$. Cathode 14 is in the form of a filament energized through parallel shielded lines by filament transformer 20, the center-tap of which is connected to the cathode terminal of inductance $L_2$ through grid bias resistor 22, and is also connected to B— through protective resistor 24. Plate 10 is connected directly to B+.

Figure 5:
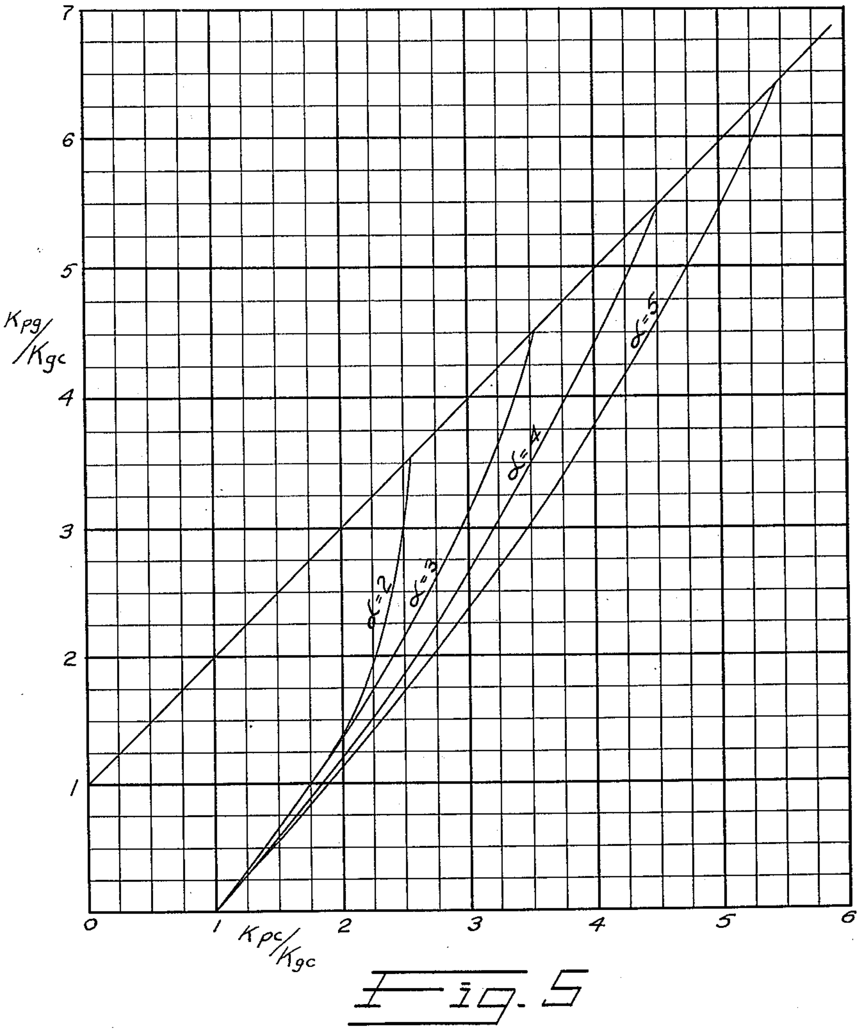
Fig. 5 is a graph of characteristic impedance ratios for parallel lines with various feedback ratios and of the limiting case of concentric lines.

In Fig. 5 there is shown a family of curves, theoretically derived, of the ratio of grid-to-plate characteristic impedance compared with grid-to-cathode characteristic impedance $K_{gp}/K_{gc}$ against the ratio of plate-to-cathode characteristic impedance compared with grid-to-cathode characteristic impedance $K_{pc}/K_{gc}$ for a type 600-N triode as an oscillator, each curve being for a different ratio of plate-to-cathode R.-F. voltage divided by grid-to-cathode R.-F. voltage. These curves are for parallel lines shorted together at the same distance from the triode. A straight line is also shown in Fig. 5 which intersects with the family of curves described. This line represents the limiting condition of coaxial lines, for with such lines there is zero coupling between the grid and the plate inductances $L_1$ and $L_2$. It is seen that, as the limiting case of coaxial line tuning is approached, the feedback ratio curves diverge. From this it may be deduced that a given feedback ratio will be most stable when coaxial tuning lines are utilized. These curves are for a typical triode and illustrate the general case.

From a consideration of the parallel-line oscillator generally, not necessarily one including coaxial lines, and assuming that the grid-cathode line and the plate-cathode line are shorted at the same distance from the triode, the following relationships may be derived:

(1)

$$\frac{K_{pc}}{K_{gc}}C^2-C\left\{C_{pc}\frac{K_{pc}}{K_{gc}}+C_{pc}+C_{pg}\left(1+\frac{K_{pc}}{K_{gc}}-2k\sqrt{\frac{K_{pc}}{K_{gc}}}\right)\right\}-(1-k^2)\{C_{pc}C_{gc}+C_{pg}(C_{pc}+C_{gc})\}=0$$

(2)

$$C=(1-k^2)\frac{\alpha C_{pc}-C_{gc}}{\left(\alpha-\frac{K_{pc}}{K_{gc}}\right)-k\sqrt{\frac{K_{pc}}{K_{gc}}}(\alpha-1)}$$

wherein $C=\omega^2L_1=\omega K_{pc}\tan\theta$, which is the capacity necessary to tune the plate inductance to resonance at any given frequency and $\theta$ degrees (or equivalent) from the shorted end; $C_{pc}$, $C_{gc}$ and $C_{pg}$ are interelectrode capacities; $K_{pc}$, $K_{gc}$ and $K_{pg}$ are characteristic impedances of the respective pairs of parallel lines with the third line present; $k$ is the coefficient of coupling between the plate and grid inductances $L_1$ and $L_2$; and $\alpha$ is the ratio of the plate swing to the grid drive. When typical numerical values of interelectrode capacities and plate-to-grid voltage ratios are substituted, Equations 1 and 2 may more readily be plotted and analyzed. It is this that leads to divergent curves as shown in Fig. 5.

Concluding that stability of feedback is not to be had where the curves nearly overlie each other, it is decided that $k$ must be zero as in isolated pairs of coaxial lines, yielding the equations:

(1a)

$$K_{pc}C^2-C\{C_{pc}K_{pc}+K_{gc}(C_{gc}+C_{pg})+C_{pg}K_{pc}\}-K_{gc}\{C_{pc}C_{gc}+C_{pg}(C_{pc}+C_{gc})\}=0$$

(2a)

$$C=\frac{\alpha LC_{pc}-C_{gc}}{\alpha L-\frac{K_{pe}}{K_{gc}}}$$

From these equations the ratio of the characteristic impedances of the grid and plate coaxial lines may be determined for any desired feedback ratio. Where the lines are doubly concentric it means that any two diameters may be decided on from design requirements and the third is fixed by the expression given. It is not entirely necessary that the lines be doubly concentric, for a coaxial line may extend in one direction from the triode with the outer conductor connected to the cathode while an oppositely extending line may have its internal conductor connected to the cathode. The doubly concentric line occupies less length for a given frequency and has the tuning control means at only one end. It offers the additional advantage that a pair of parallel-connected, doubly concentric lines may be arranged in opposite directions from a single triode in order to raise the upper frequency limit attainable with coaxial lines of predetermined diameters and of minimum line length, limited by field discontinuities near the triode.

Figure 1:
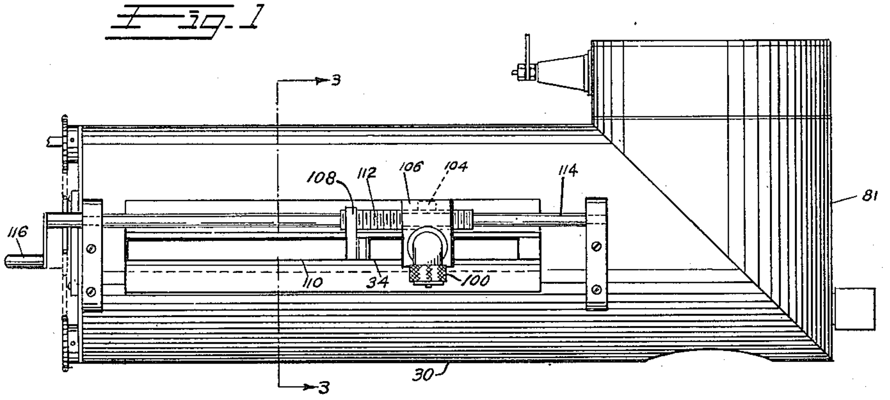
Fig. 1 is a front elevation of the specific embodiment.
Figure 2:
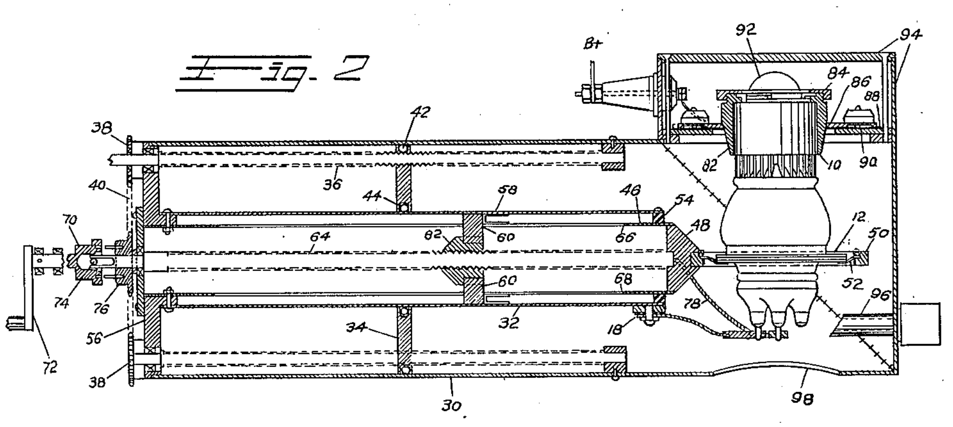
Fig. 2 is a longitudinal section thereof.
Figure 3:
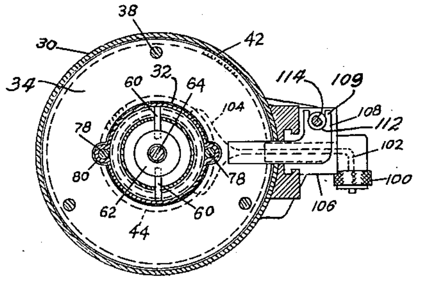
Fig. 3 is a transverse section along the line of 3—3 in Fig. 1.

In Figs. 1 to 3 there is shown an oscillator embodying the desirable characteristics explained above. The grid-cathode line is arranged within the plate-cathode line. The triode is arranged with its axis perpendicular to that of the tuning lines in Fig. 2. The plate cylinder 30 surrounds cathode cylinder 32, and this plate-cathode coaxial line 30, 32 is adjustable in length as determined by the position of shorting ring 34. Multiple screws 36 are coupled as by sprockets 38 and a chain 40 to move ring 34 axially. Ring 34 is spaced from cylinders 30 and 32 by helical Phosphor-bronze springs 42 and 44 which form effective electrical brushes. These springs are so proportioned and confined that the turns are canted at an angle to the surfaces contacted.

The inner surface of cylinder 32 forms the outer line of the grid-cathode inductance. Innermost cylinder 46 having a conical head 48 is connected by means of ring 50 and spring fingers 52 to grid 12 of the triode. At the triode end, cylinders 32 and 46 are maintained concentric by means of insulating blocks 54. At the opposite end, cylinders 32 and 46 are maintained concentric with each other and with cylinder 30 by means of header 56. The electrical length of coaxial line 32, 46 is determined by shorting ring 58 which is U-shaped in section and axially slotted to provide spring fingers (the sides of the U) for reliably contacting the surfaces of line 32, 46. Ring 58 is movable axially by arms 60 secured to threaded sleeve 62 on threaded shaft 64. The latter is coaxial with all the cylinders. It is supported at the triode end in conical head 48 and at its opposite end on header 56. Cylinder 46 is slotted nearly end to end at 66 and 68 to accommodate arms 60. Shaft 64 may be rotated by means of axially slidable member 70 which may be manipulated by means of hand crank 72 or other suitable means. Member 70 may be slid axially by virtue of pin and slot connection 74 to engage sprocket 76, which is free to turn on shaft 64. As a preliminary adjustment, shaft 64 may be rotated in either direction to track shorting rings 34 and 58. Thereafter with member 70 clutched to the sprocket 76, rings 34 and 58 may be caused to move in unison. The initial setting may be accomplished using meters as a guide and thereafter it may be accomplished by correlating revolution counters (not shown) geared to shafts 36 and 64.

Cathode line 32 is coupled to the filament center-tap through blocking capacitor 18 in Fig. 2 just as in Fig. 4. The insulated filament lines 78 are carried in tubes 80 (Fig. 3) exterior of and secured to cathode cylinder 32 and extend through header 56 for connection to the filament transformer.

The triode is principally supported in a cylindrical shield 81 at right angles to the double concentric line in order to minimize discontinuity of the fields. Triode plate 10 is gripped by spring fingers 82 which form an integral part of a specialized clamp 84. This clamp is secured to plate 86 which is connected to positive terminal of the B supply. Plates 86 and 90, with dielectric 88 constitute capacitor 16 of Fig. 1, to provide an R.-F. path to plate line 30. The triode plate is cooled by means of air blown in through aperture 92 in shield 94 surrounding clamp 84. Another air duct 96 cools the filament and cathode terminals. The cooling air is exhausted through hole 98 in cylinder 30.

The oscillator described is designed for high efficiency and moderate power. The output is best obtained by inductive coupling to the plate-cathode coaxial line as shown in Figs. 1 and 3. Output coupling 100 has an inner conductor 102 which is connected to a sliding contact 104 engaging cylinder 32 on the exterior surface thereof. Coupling 100 is carried in a slide 106. Arm 108 is fastened to ring 34 and extends through slot 110 in cylinder 30. Arm 108 has a forked end 109 retained in a groove in exteriorly threaded tube 112 which is threaded into slide 106, thus spacing sliding contact 104 from ring 34. Slide 104 is carried along axially with ring 34 as an incident to tuning adjustment. Tube 112

SEARCH ROOM is keyed or splined to rod 114, as shown in Fig. 3, so that the position of slide 106 relative to ring 34 may be adjusted by hand crank 116 or any suitable control regardless of the position of ring 34.

It is to be understood that various modifications and changes may be made in this invention without departing from the spirit and scope thereof as set forth in the appended claims.

What is claimed is:

1. High-frequency oscillator apparatus comprising an electron discharge tube having an anode, a cathode and a control grid, resonator means associated with said tube, said resonator means comprising a plurality of nested substantially coaxial members defining at least two space resonant regions capable of maintaining standing high-frequency electromagnetic oscillations therein, one of said regions being connected to said anode and said cathode, another of said regions being connected to said grid and said cathode, said regions being adapted for feedback coupling therebetween, means for exciting said one region, and adjustably positionable output means coupled to said other region.

2. The apparatus defined in claim 1 wherein said output means comprises a contact member engageable with an inner one of said members, said apparatus being further characterized by means for conjointly adjusting and maintaining the electric lengths of said two space resonant regions substantialy equal to each other, said contact member being selectively movable with said adjusting means.

3. In a high-frequency electron discharge tube oscillator of the type wherein the tube includes a cathode, a grid and an anode, the combination of an adjustable-length section of doubly-coaxial transmission line comprising an inner conductive cylinder, an intermediate conductive cylinder and an outer conductive cylinder, reactive means connecting said intermediate cylinder to said cathode, reactive means connecting said outer cylinder to said anode, means connecting said inner cylinder directly to said grid, the respective connections of said cylinders to said cathode, grid and anode providing tunable anode and tunable grid circuits for said tube, said cylinders being dimensioned to provide feedback coupling between said anode and grid circuits, means for energizing said tunable grid circuit, whereby the oscillator is set into high-frequency oscillation, and selectively adjustable means coupled to said anode circuit for deriving output energy therefrom.

4. The combination defined in claim 3 further characterized by adjustable tuning means for said anode and said grid circuits, said tuning means comprising short-circuiting elements between respective pairs of said cylinders, said short-circuiting elements being axially movable to alter the operating frequencies of said circuits in unison, and wherein said selectively adjustable means comprises a slidable contact engageable with said intermediate cylinder and movable with said short-circuiting elements.

5. In an ultra-high-frequency oscillator apparatus wherein an electron discharge device is connected to a plurality of coaxial conductor systems providing tunable circuits for said device, the combination comprising adjustable short-circuiting means for individual ones of said systems, an output circuit associated with one of said short-circuiting means, and means conjointly adjusting the positions of each said short-circuiting means and said output circuit.

6. The combination as in claim 5 further comprising means adjustably spacing said output circuit relative the associated short-circuiting means and independently of said conjoint adjustment.

7. Ultra-high-frequency apparatus comprising a coaxial line resonator having inner and outer cylindrical conductors, said outer conductor being axially slotted along a portion of its length, a conductive disc between the outer surface of said inner conductor and the inner surface of said outer conductor, means for adjusting the position of said disc to vary the operating length of said resonator, and energy coupling means for said resonator comprising a sliding contact member engageable with said inner conductor and having a projection extending through the slot in said outer conductor, and means interconnecting said disc and projection in predetermined axially spaced relation, whereby said contact member is postionable in said resonator in accordance with adjustment of said disc.

8. The apparatus as in claim 7 further comprising means for altering said predetermined spaced relation independently of adjustment of said disc.

9. A tunable cavity resonator comprising means defining a space resonant system, a movable partition for altering the dimension of said system thereby to vary the operating frequency thereof, slidable contact means within said system providing energy coupling between the system and the exterior, and means for conjointly adjusting the position of said partition and said coupling means.

10. High-frequency oscillator apparatus comprising an electron discharge tube having an anode, a cathode and a control grid, resonator means associated with said tube, said resonator means comprising a plurality of nested substantially coaxial members defining at least two spaced resonant regions capable of maintaining standing high-frequency electromagnetic oscillators therein, the outermost one of said members being axially slotted, one of said regions being connected to said anode and said cathode, another of said regions being connected to said grid and said cathode, means for exciting said one region, and output means comprising a contact member slidable along the surface of the intermediate one of said members, and a section of coaxial transmission lines having an inner conductor extending through the slot in said outermost member and coupled to said contact member.

11. A tunable cavity resonator comprising means defining a space resonant system, a movable partition for altering a dimension of said system thereby to vary the operating frequency thereof, means within said system providing energy coupling between the system and the exterior, said partition and said coupling means being adapted to be maintained in predetermined spaced relation, means for conjointly adjusting the positions of said partition and said coupling means, and means for altering said predetermined spaced relation independently of said adjusting means.

12. A tunable cavity resonator comprising means defining a space resonant system, a movable partition for altering the dimension of said system thereby to vary the operating frequency thereof, means within said system providing energy coupling between the system and the exterior, said coupling means comprising a slidable contact member engaging a conductive wall portion of said system-defining means, said partition and said contact member being adapted to be maintained in predetermined spaced relation, and means for conjointly adjusting the position of said partition and said coupling means.

13. A tunable cavity resonator comprising means defining a space resonant system, a movable partition for altering the dimension of said system thereby to vary the operating frequency thereof, means within said system providing energy coupling between the system and the exterior, said coupling means comprising a slidable contact member projecting through a wall of said system-defining means and adapted to engage a conductive wall portion thereof, and means for conjointly adjusting the position of said partition and said coupling means.

PAUL S. LANSMAN.

REFERENCES CITED

The following references are of record in the file of this patent:

UNITED STATES PATENTS

| Number | Name | Date |
|---|---|---|
| 2,109,843 | Kassner | Mar. 1, 1938 |
| 2,132,208 | Dunmore | Oct. 4, 1938 |
| 2,169,396 | Samuel | Aug. 15, 1939 |
| 2,416,315 | Hartman | Feb. 25, 1947 |